Sept. 4, 1962  R. H. LAPP  3,052,303
MECHANICALLY OPERATED FIRE DETECTOR
Filed Jan. 30, 1961  2 Sheets-Sheet 1

ROGER H. LAPP
INVENTOR

BY
*W. O. Quesenberry*
*Claude Funkhouser*
ATTORNEYS

Sept. 4, 1962  R. H. LAPP  3,052,303
MECHANICALLY OPERATED FIRE DETECTOR

Filed Jan. 30, 1961  2 Sheets-Sheet 2

ROGER H. LAPP
INVENTOR

BY
ATTORNEYS 3,052,303
MECHANICALLY OPERATED FIRE DETECTOR
Roger H. Lapp, Silver Spring, Md., assignor to the United States of America as represented by the Secretary of the Navy
Filed Jan. 30, 1961, Ser. No. 85,941
5 Claims. (Cl. 169—2)

This invention relates generally to fire extinguishing devices. More particularly, it relates to a fire extinguishing device employing a mechanically operated blast detecting means.

The storage of missiles, particularly in magazines on shipboard, creates a serious safety problem, inasmuch as the inadvertent ignition of the solid propellant grain of a rocket motor could obviously produce disastrous results. In order to reduce the hazard, it has been proposed to provide fire detecting means for monitoring rocket motors and for automatically actuating fire extinguishing means. It is desirable to avoid the use of electrically controlled detecting means since such means are often costly and require periodic inspection in order to maintain them in proper working condition. If batteries are used, they must be replaced or recharged, and if ship's power is used the problem of suitable electrical circuitry connecting the power source and the detecting means arises. Furthermore, generated electricity is unreliable because during battle when most needed it is likely to be shut off. The detecting means should preferably be free from the disadvantages of electrically controlled systems, but yet possess an efficiency comparable thereto.

Accordingly, it is an object of the present invention to provide a fire detector and water release means suitable for monitoring a solid propellant rocket motor and for extinguishing any premature fire therein.

Another object of the invention is to provide a relatively simple mechanical detector having but few component parts.

A further object is to provide a fire detector that is light in weight, inexpensive, and easy to assemble.

Other objects and many of the attendant advantages of this invention will be readily appreciated as the same becomes better understood by reference to the following detailed description when considered in connection with the accompanying drawings, wherein.

Generally, the present invention comprises a nozzle device adapted to be secured to a standpipe of a pressurized water supply system and includes a frictionally latched clapper valve for preventing flow of water through the device. A water supply main extends underneath the missile storage magazine and a standpipe is tapped from said main directly beneath each compartment of the magazine. Each missile is positioned in its compartment so that a standpipe therein is directed toward the exhaust nozzle of said missile. Inadvertent ignition of the rocket propellant grain produces an exhaust blast to which the valve latching means is responsive. The blast causes the latch to release, thereby permitting the clapper valve to be opened by the force of the water under pressure, whereby the ignited rocket will be extinguished.

Figure 1:
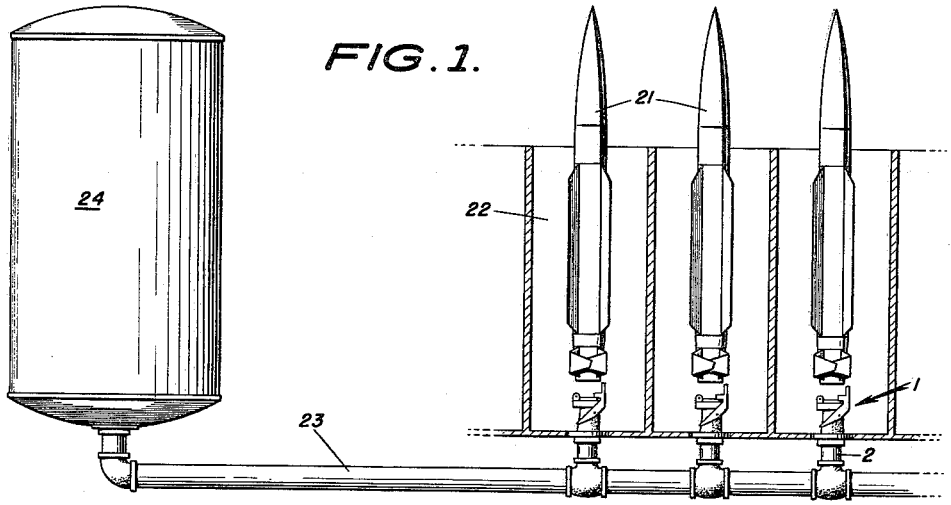
FIG. 1 is a diagrammatic view of the fire detecting device of the present invention, shown installed in a pressurized water supply system and monitoring a plurality of solid propellant rocket motors.

Referring to FIG. 1 of the drawing, a plurality of missiles 21 are shown in their stored, vertical positions in compartments 22 of a missile magazine. A main 23 is supplied with water under pressure from a suitable pressurized water supply means 24, said main extending beneath the compartments 22. A plurality of standpipes 2 are tapped from the fire main 23 at points directly beneath the storage compartments 22 and are directed toward the exhaust nozzles of the missiles stored therein. Each standpipe has mounted thereon a fire detecting device 1 of the instant invention, whereby inadvertent ignition of the propellant grain of a missile rocket motor in any of the compartments 22 will be detected and quickly extinguished.

Figure 2:
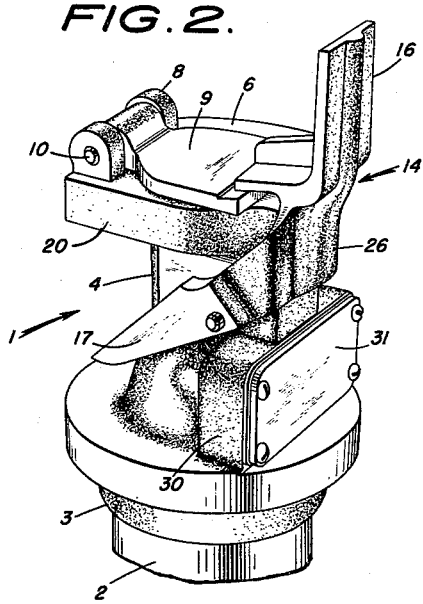
FIG. 2 is a perspective view of the fire detecting device shown installed on a standpipe of a pressurized water supply system.
Figure 3:
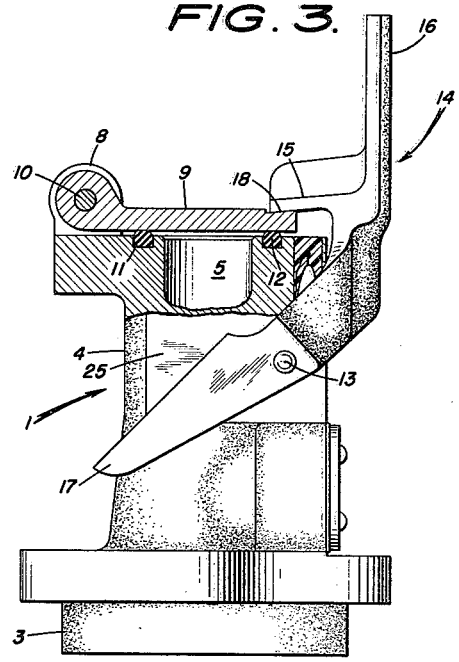
FIG. 3 is a side elevation, partially in section, showing the fire detecting device in its ordinary monitoring condition.

Referring to FIGS. 2–5, the fire detector 1 is shown mounted on standpipe 2 by an integral neck 3 to form water supply outlet means comprising a nozzle. Integral with the neck 3 is an intermediate nozzle body portion 4 having a tapered section and a straight section with a bore 5 therein. The nozzle body portion 4 terminates in a plate 6 having a discharge opening 7 at the upper end of the bore 5. Hinge loops 8 are provided on the upper surface of plate 6 at one end thereof, and a clapper valve 9 is pivotally mounted between said loops by a pivot pin 10. The free end of valve 9 is provided with a lip 18. The upper surface of plate 6 is provided with a circumferential groove 1 concentric with the discharge opening 7, and a deformable resilient O-ring 12 is fitted in said groove. When the clapper valve is in closed position, as shown in FIGS. 2 and 3, the deformable resilient O-ring 12 cooperates therewith to provide an effective seal for the discharge opening 7.

Figure 5:
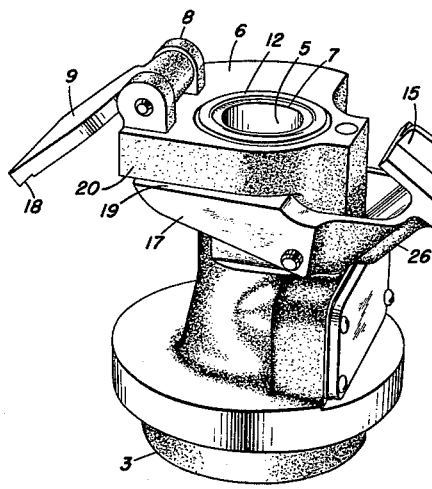
FIG. 5 is a view similar to FIG. 2, but showing the device in open valve condition.

The plate 6 is further provided with flanges 20 which extend laterally of the body portion 4. Opposite sides of the body portion are provided with flat surfaces 25 which extend from the underside of the flanges 20 to a point approximately midway between the plate 6 and the neck 3 where the tapered section of nozzle body 4 begins. A latch 14 is pivotally mounted on the body portion 4 by a pin 13, which pin extends transversely of the flat surfaces 25. The latch 14 includes a latch arm 15, the undersurface of which is parallel to and engages the upper surface of lip 18 when both the clapper valve 9 and the latch are in closed positions, as shown in FIGS. 2 and 3. In this position, the deformable resilient sealing ring presses the valve into contact with the latch, urging the latch to remain in the closed position. Extending substantially at right angles to latch arm 15, is an extension or paddle arm 16. A yoke portion 26 is formed immediately adjacent the juncture of the paddle arm 16 and the latch arm 15. The yoke portion 26 terminates in counterweights 17 which straddle the nozzle body 4 and through which the pin 13 extends. The counterweights 17 are provided with flat surfaces 19 which engage the undersurfaces of flanges 20 to form a stop for latch 14 in its released position, as shown in FIG. 5. The counterweights 17 are so formed that the pin 13 extends through the center of gravity thereof so that vibration of the device will not cause the latch to accidentally release.

The angular disposition of the lip 18 of clapper valve 9 is related to the location of pin 13, and is dependent on the design force required to open the latch 14. In the illustrated embodiment of the instant invention, the lip 18 forms an interior angle of 85° with a plane passing through the pin 13 and the center of the contact surfaces of the lip and watch arm. Because of this relationship, when the forces exerted on the clapper valve 9 by the deformable resilient O-ring 12 and by the water under pressure in bore 5 push the lip 18 against the undersurface of latch arm 15, a component of force will be transmitted to the latch arm in a direction to bias the latch 15 closed. The lip angle may be varied according to the design opening force for the latch, but there are maximum and minimum limits within which the angle must be kept. The maximum value of the interior lip angle cannot be greater than 90° since in this condition a component of force exists tending to open the latch. The minimum value of the angle depends on the deformability of the O-ring 12. As the latch 14 opens, the end of latch arm 15 pivots about the pin 13 and passes over the lip 18, forcing it down and further deforming the O-ring 12. If the lip angle is too small, the deformability of O-ring 12 may not be great enough to permit the latch arm 15 to clear lip 18.

Because of the problem of lip clearance, it is not desirable to locate the pin 13 too close to the latch arm 15, since this would give the latch arm a short radius of rotation about the pivot pin. The shorter the radius of rotation, the more the O-ring must be deformed to allow the latch arm to clear the lip as the latch 14 swings open. The location of pin 13 is further limited by the tapered bore of the tapered section of the nozzle body 4.

The detector is set for operation by pivoting the clapper valve 9 over the discharge opening 7, and pivoting the latch 14 into its closed position as shown in FIG. 2. The undersurface of arm 15 and the upper surface of lip 18 will be frictionally engaged and the valve 9 will be pressed downwardly by the latch toward the discharge opening 7, thereby deforming O-ring 12. Water under pressure is then admitted into bore 5 by suitable valve means (not shown) in the water supply system. The forces exerted by the water pressure in bore 5 and by the deformed resilient O-ring 12 act to push the valve 9 against the latch 14, thereby maintaining frictional engagement between the lip 18 and the latch arm 15. The angle of the lip 18, as previously described, produces a component of force acting on the undersurface of latch arm 15 in a direction to bias the latch 14 closed.

Inadvertent ignition of the solid propellant grain of one of the stored missiles will cause the grain to burn in a common manner. For example, an initial blast of exhaust gases will result, followed by a short pause during which a relatively smaller amount of gases is expelled. After this pause, the propellant grain will burn vigorously and ultimately be completely consumed, yielding catastrophic damage to the system in which the missile is stored if allowed to proceed unchecked.

Figure 4:
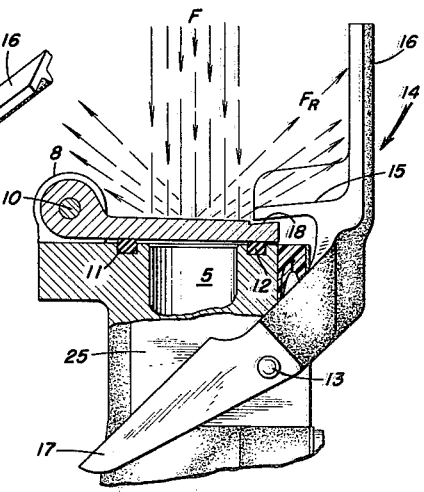
FIG. 4 is a view similar to FIG. 3, but showing the device at the instant of fire detection.

With speed of detection being of the essence, the initial blast of gases will strike the valve 9, as shown in FIG. 4, and push it downwardly, thereby further deforming O-ring 12 and reducing the frictional force exerted on the latch arm 15 by lip 18. The latch arm and lip have been shown as being separated in order to pictorially represent this reduction in the friction force. In practice, the members may still be touching even though the frictional force between them has been reduced. The reflected or splash forces FR resulting from the blast will strike the extension or paddle arm 16 with a component of force sufficient to overcome any remaining friction and will propel the latch into its open position. With the friction force removed, the force exerted by the water under pressure in bore 5 and by the deformed resilient O-ring 12 will then act to lift the valve 9 from the discharge opening and pivot it to its open position. This opening of the valve is very rapid and occurs immediately following the initial blast of gases. The water will then be forced into the combustion chamber to extinguish the fire in the propellant grain. It should be noted that the force required to open the latch can be varied by changing the area of the paddle arm of the latch.

Part of the essence of the invention is the manner in which study of the fluctuating nature of rocket fires resulted in the matching of operating characteristics of the detector with the propellant burning characteristics. Thus the clapper valve 9 is opened prior to the time when subsequent exhaust gas flow might overpower the valve and tend to hold it shut.

Inasmuch as the missiles are stored in closed isolated compartments, actuation of a fire detector could go unnoticed by the ship's personnel. It is necessary that the missile launcher operating personnel be apprised of the fact that there may be damage in a section of the missile magazine, and also that it is necessary to look to another part of the magazine for undamaged missiles for combat use. In order to signal the occurrence of a fire, each detector may be provided with a switch connected by a suitable circuit to a signal device located in a manned part of the ship, so that said device indicates actuation of the detector.

Figure 7:
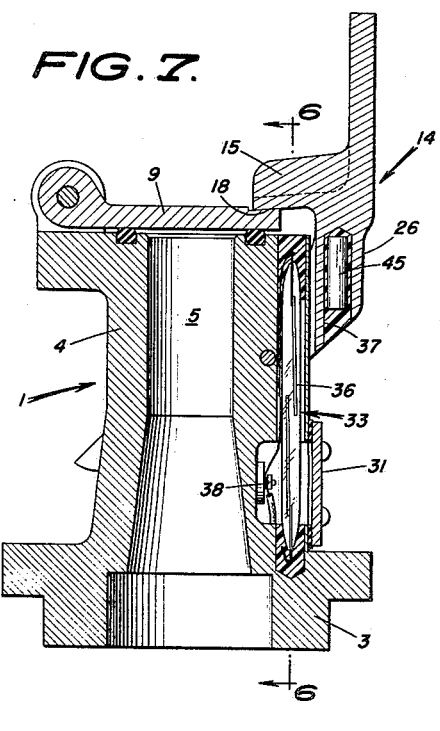
FIG. 7 is a view similar to FIG. 3, but showing the entire device in axial section.
Figure 6:
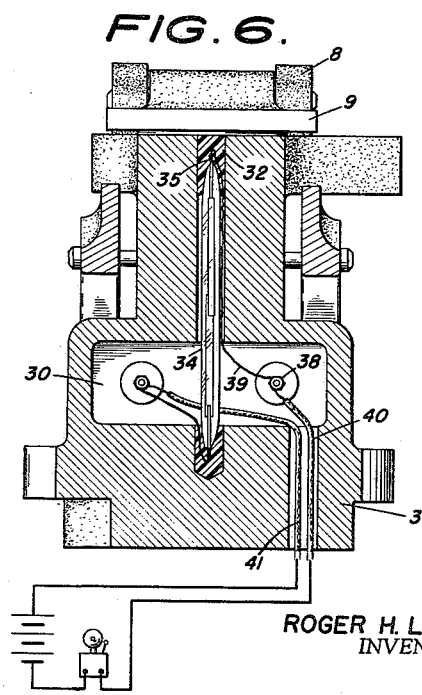
FIG. 6 is a sectional view taken on line 6—6 of FIG. 7 with the latch removed for the purpose of clarity, and showing particularly the magnetically operated switch that is connected in an indicator circuit for showing, at a remote point, when the valve is released.

Referring to FIGS. 6 and 7, a switch box 30 is integrally formed with the intermediate body portion 4 and coupling 3, and extends transversely of the flat portions 25. The switch box 30 has an open face lying in the same plane as the side of the straight intermediate body portion 4 directly above. The open face of switch box 30 is provided with a gasket and a cover plate 31 removably secured thereto by any suitable fastening means such as screws.

A bore 32 extends parallel to the axis of bore 5 from the top surface of plate 6 to a point in the neck 3 slightly beneath box 30. The axis of bore 32 extends substantially through the center of switch box 30 and houses a rod shaped switch 33 packed in a waterproof epoxy resin. The switch 33 comprises a glass tube 34 having end terminals 35 sealed therein, which terminals extend within the tube and are attached to magnetic leaf fingers 36. The fingers 36 have contact surfaces near their outer ends and are normally spaced apart, but when in proximity of a magnetic field they are caused to contact and close the switch.

The yoke portion 26 of latch 14 is provided with a centrally located bore or recess 37 which houses a bar magnet 45 packed in epoxy resin, and which is substantially parallel to bore 32 when the latch is in closed position. Two terminals 38 are secured to the inner wall of switch box 30, and are connected by lead wires 39 to the end terminals 35. Wires 40 communicate with the interior of the switch box through a bore 41 in the neck 3 and are also connected to the terminals 38. The wires 40 are part of a circuit, shown schematically in FIG. 6, including a suitable signal device for indicating when the valve is open or closed.

As long as the latch 14 remains closed the signal device so indicates; however, motion of the latch to cause the disengagement of latch arm 15 from the lip 18 will cause the magnet 45 to move toward the contact surfaces of the leaf fingers 36 for engaging said fingers and thus closing the switch 33. The signal device will then indicate activation of the detector.

Conversely, the signal device indicates that the latch is open until the latch arm 15 and lip 18 are positively engaged. The engaging motion of the latch will cause the magnet 45 to move away from the contacting surfaces of the leaf fingers 36, causing the switch 33 to open. The signal device will then indicate that the detector is in its secure or "latch closed" position. This convenient arrangement is made possible by the hysteresis characteristics of the magnetic switch leaf fingers 36. Thus the condition of the fire detector device will not be erroneousously indicated due to a signal resulting from a partially disengaged latch.

It should now be apparent that the device of the present invention is extremely simply and efficient. Very little time is required to reset the device to its monitoring condition after a fire has been extinguished, and a very simple inspection procedure will ensure operability.

It should be noted that the present invention may be used to monitor blast producing combustible materials other than solid rocket propellants. Obviously, many other modifications and variations of the present invention are possible in the light of the above disclosure. It should therefore be understood that within the scope of the appended claims the invention may be practiced otherwise than as specifically described.

What is claimed is:

1. A fire detecting and extinguishing device for monitoring a rocket motor having a solid propellant grain, said device comprising; a pressurized water supply, water supply outlet means located between said propellant grain and said pressurized water supply, valve means for normally preventing flow of pressurized water through said outlet means, deformable resilient sealing means interposed between said valve means and said water supply outlet means, and latch means including a paddle arm for frictionally holding said valve means closed, said sealing means when deformed urging the valve means into frictional contact with the latch means to thereby create said frictional holding force whereby a blast produced by inadvertent ignition of said propellant grain will strike said valve means and the reflected blast therefrom will strike said paddle arm, thereby releasing said latch means from said valve means and permitting water under pressure to open said valve means and extinguish the ignited grain.

2. A fire detecting and extinguishing device for monitoring a rocket motor having a solid propellant grain, said device comprising; a pressurized water supply, water supply outlet means located between said propellant grain and said pressurized water supply, valve means for normally preventing flow of pressurized water through said outlet means, deformable resilient sealing means interposed between said valve means and said water supply outlet means, and latch means having a latch arm and a paddle arm, said latch arm engaging a portion of said valve means for frictionally holding said valve means closed and said paddle arm forming an angle with said latch arm and extending toward said propellant grain said sealing means when deformed urging the valve means into frictional contact with the latch means to thereby create said frictional holding force, whereby a blast produced by inadvertent ignition of said propellant grain will strike said valve means, causing said sealing means to be further deformed, thereby reducing said frictional holding force, and the reflected blast from said valve means will strike said paddle arm, thereby releasing said latch arm from said valve means and permitting water under pressure to open said valve means and extinguish the ignited grain.

3. A fire detecting and extinguishing device according to claim 2, further including an enclosed electrical switch carried by said water supply outlet means on the exterior thereof, magnetic actuating means carried by said latch means, an external power source, and an external alarm means arranged in series with said electrical switch and power source, said actuating means activating said switch when said latch is in the open position, thereby activating said alarm means signifying that the device is in operation.

4. A fire detecting and extinguishing device according to claim 2, wherein the portion of said valve means engaging said latch arm comprises a lip extending parallel to the latch arm and at an angle such that the latch means, when closed, is urged to maintain that position, and said angle of the valve lip offering a surmountable obstacle to the latch means when opening, thereby allowing said latch means to release the valve means when struck by the reflected blast.

5. A fire detecting and extinguishing device according to claim 2, wherein the latch means further includes an integral yoke portion adjacent the juncture of the paddle arm and latch arm, and counterweights integral with said yoke portion and straddling the nozzle means, said latch means being pivotally mounted at its center of gravity, and wherein the valve means further includes a clapper valve pivotally mounted on said water supply outlet means.

References Cited in the file of this patent

UNITED STATES PATENTS

| | | |
|---|---|---|
| 1,344,630 | Free | June 29, 1920 |
| 2,351,365 | Piagneri | June 13, 1944 |
| 2,447,174 | Griffith | Aug. 17, 1948 |
| 2,989,124 | Lapp et al. | June 20, 1961 |
| 3,001,586 | Kyle | Sept. 26, 1961 |